United States Patent
Palin et al.

(10) Patent No.: US 7,352,998 B2
(45) Date of Patent: Apr. 1, 2008

(54) METHOD AND SYSTEM FOR ESTABLISHING A WIRELESS COMMUNICATIONS LINK

(75) Inventors: Arto Palin, Viiala (FI); Juha Salokannel, Kangasala (FI); Jukka Reunamaki, Tampere (FI)

(73) Assignee: Nokia Corporation, Espoo (FI)

( * ) Notice: Subject to any disclaimer, the term of this patent is extended or adjusted under 35 U.S.C. 154(b) by 656 days.

(21) Appl. No.: 10/660,544

(22) Filed: Sep. 12, 2003

(65) Prior Publication Data

US 2005/0059345 A1   Mar. 17, 2005

(51) Int. Cl.
H04B 7/00 (2006.01)

(52) U.S. Cl. .............. 455/41.2; 455/426.1; 455/426.2

(58) Field of Classification Search ........... 455/41.2, 455/552.1, 553.1, 426.1, 426.2
See application file for complete search history.

(56) References Cited

U.S. PATENT DOCUMENTS

| | | | |
|---|---|---|---|
| 5,307,370 | A | 4/1994 | Eness |
| 5,677,927 | A | 10/1997 | Fullerton et al. |
| 5,687,169 | A | 11/1997 | Fullerton |
| 6,144,464 | A | 11/2000 | Rupp et al. |
| 6,172,673 | B1 | 1/2001 | Lehtinen et al. |
| 6,349,199 | B1 | 2/2002 | Armantrout |
| 6,507,734 | B1 | 1/2003 | Berger et al. |
| 6,539,503 | B1 | 3/2003 | Walker |
| 6,549,567 | B1 | 4/2003 | Fullerton |
| 6,556,825 | B1 * | 4/2003 | Mansfield ............... 455/426.1 |
| 6,571,089 | B1 | 5/2003 | Richards et al. |
| 6,571,212 | B1 | 5/2003 | Dent |
| 6,587,949 | B1 | 7/2003 | Steinberg |
| 6,799,287 | B1 | 9/2004 | Sharma et al. |
| 6,957,086 | B2 * | 10/2005 | Bahl et al. ............... 455/557 |
| 6,961,541 | B2 | 11/2005 | Overy et al. |
| 6,993,343 | B2 | 1/2006 | Yoshii et al. |
| 7,096,033 | B1 | 8/2006 | Bell |
| 7,103,314 | B2 * | 9/2006 | Li ............... 455/41.2 |
| 2001/0007815 | A1 * | 7/2001 | Philipsson ............... 455/41 |
| 2001/0049262 | A1 | 12/2001 | Lehtonen |
| 2001/0055356 | A1 | 12/2001 | Davies |

(Continued)

FOREIGN PATENT DOCUMENTS

CA  2443871 A1 * 2/2003

(Continued)

OTHER PUBLICATIONS

PCT Search Report, Oct. 10, 2005, 6 pages.

(Continued)

*Primary Examiner*—Matthew Anderson
*Assistant Examiner*—Angelica M. Perez
(74) *Attorney, Agent, or Firm*—Morgan & Finnegan LLP

(57) ABSTRACT

A method and system for establishing a wireless communications link determines, through a first short-range communications link of a first type, whether a remote device is capable of supporting a short-range communications link of a second type. If so, information is exchanged with the remote device across the first communications link to establish a second short-range communications link of the second type. Once established, communications with the remote device across the second short-range communications link may commence. The first communications link may be a Bluetooth link and the second communications link may be an ultra wideband (UWB) link.

29 Claims, 12 Drawing Sheets

U.S. PATENT DOCUMENTS

| | | | |
|---|---|---|---|
| 2002/0003792 A1 | 1/2002 | Schmidt et al. | |
| 2002/0065099 A1 | 5/2002 | Bjorndahl | |
| 2002/0073269 A1 | 6/2002 | Kawashima et al. | |
| 2002/0080866 A1 | 6/2002 | Bouet et al. | |
| 2002/0151276 A1* | 10/2002 | Ito | 455/41 |
| 2003/0032422 A1 | 2/2003 | Wynbeek | |
| 2003/0063196 A1 | 4/2003 | Palatov et al. | |
| 2003/0078037 A1* | 4/2003 | Auckland et al. | 455/422 |
| 2003/0100288 A1 | 5/2003 | Tomlinson, Jr. et al. | |
| 2003/0108010 A1* | 6/2003 | Kim et al. | 370/333 |
| 2003/0137966 A1 | 7/2003 | Odman et al. | |
| 2003/0147453 A1 | 8/2003 | Bantra | |
| 2003/0148767 A1 | 8/2003 | Sugaya et al. | |
| 2003/0174048 A1* | 9/2003 | McCorkle | 340/10.34 |
| 2003/0203741 A1 | 10/2003 | Matsuo et al. | |
| 2004/0066762 A1 | 4/2004 | Alastalo | |
| 2004/0204076 A1 | 10/2004 | Kotzin | |
| 2004/0214568 A1* | 10/2004 | Anderson | 455/426.1 |
| 2004/0219897 A1 | 11/2004 | Choi | |
| 2004/0235468 A1* | 11/2004 | Luebke et al. | 455/426.1 |
| 2005/0037775 A1* | 2/2005 | Moeglein et al. | 455/456.1 |
| 2005/0058107 A1 | 3/2005 | Salokannel et al. | |
| 2005/0058116 A1 | 3/2005 | Palin et al. | |
| 2005/0058152 A1 | 3/2005 | Salokannel et al. | |
| 2005/0078598 A1 | 4/2005 | Batra et al. | |
| 2005/0097408 A1 | 5/2005 | Palin et al. | |
| 2005/0193309 A1 | 9/2005 | Grilli et al. | |
| 2005/0283207 A1 | 12/2005 | Hochmair et al. | |

FOREIGN PATENT DOCUMENTS

| | | |
|---|---|---|
| DE | 10140446 A1 | 3/2003 |
| EP | 0999717 A2 | 5/2000 |
| EP | 1 185 033 A1 | 3/2002 |
| EP | 1274194 A1 | 1/2003 |
| EP | 1515473 A2 | 3/2005 |
| GB | 2 287 383 | 9/1995 |
| WO | WO 99/38302 | 7/1999 |
| WO | WO 99/41876 | 8/1999 |
| WO | WO 01/45319 | 6/2001 |
| WO | WO 02/21746 A2 | 3/2002 |
| WO | WO 03/084146 A1 | 10/2003 |

OTHER PUBLICATIONS

U.S. Appl. No. 10/870,060, filed Jun. 18, 2004, Kossi et al.

The Bluetooth Special Interest Group, Specification of The Bluetooth System, vol. 1 & vol. 2, Core and Profiles: Version 1.1, Feb. 22, 2001.

O'Donnell et al., "An Integrated, Low Power, Ultra-Wideband Transceiver Architecture for Low-Rate, Indoor Wireless Systems", Dept. of Electrical Engineering & Computer Science, University of California, Berkeley, Berkeley, CA, 8 pgs.

P. I. I. Withington, et al., "An Impulse Radio Communication System", "Proceedings of the International Conference on Ultra-Wideband, Short Pulse Electromagnetics", (ISBN 0-306-44530-1), Oct. 19, 1992, pp. 113-200.

J. Bray and C. Sterman, "Bluetooth 1.1-Connect Without Cables", Prentice Hall Inc., Upper Saddle River, NJ 1002 (ISBN 0-13-066106-6), Sects. 5.4, pp. 70-78.

D. J. Costello, Jr., et al., "Applications of Error-Control Coding", IEEE Transactions of Information Theory, Oct. 1998, vol. 44, pp. 2531-2560.

Walter Hirt, "Ultra-wideband radio technology: overview and future research", Computer Communications, Amsterdam, NL, vol. 26, No. 1, Feb. 2003, pp. 46-52.

* cited by examiner

| Segment | TYPE code $b_3b_2b_1b_0$ | Slots | SCO link (1 Mbps) | eSCO link (1 Mbps) | eSCO link (2/3 Mbps) | ACL link (1 Mbps) [ptt=0] | ACL link (2/3 Mbps) [ptt=1] | ACL link (8/12 Mbps) [ptt=2] | ACL link (100/400 Mbps) [ptt=3] |
|---|---|---|---|---|---|---|---|---|---|
| 1 | 0000 | 1 | NULL | NULL | NULL | NULL | NULL | NULL | NULL |
|   | 0001 | 1 | POLL | POLL | POLL | POLL | POLL | POLL | POLL |
|   | 0010 | 1 | FHS | Undefined | Undefined | FHS | FHS | FHS | FHS |
|   | 0011 | 1 | DM1 | Undefined | Undefined | DM1 | DM1 | DM1 | DM1 |
| 2 | 0100 | 1 | Undefined | Undefined | Undefined | DH1 | 2-DH1 | 3-DH1 | 100-DH1 |
|   | 0101 | 1 | HV1 | Undefined | Undefined | Undefined | Undefined | Undefined | Undefined |
|   | 0110 | 1 | HV2 | Undefined | 2-EV3 | Undefined | Undefined | Undefined | Undefined |
|   | 0111 | 1 | HV3 | EV3 | 3-EV3 | Undefined | Undefined | Undefined | Undefined |
|   | 1000 | 1 | DV | Undefined | Undefined | Undefined | Undefined | Undefined | Undefined |
|   | 1001 | 1 | Undefined | Undefined | Undefined | AUX1 | AUX1 | AUX1 | AUX1 |
| 3 | 1010 | 3 | Undefined | Undefined | Undefined | DM3 | 2-DH3 | 8-DH3 | 100-DH3 |
|   | 1011 | 3 | Undefined | Undefined | Undefined | DH3 | 3-DH3 | 12-DH3 | 400-DH3 |
|   | 1100 | 3 | Undefined | EV4 | 2-EV5 | Undefined | Undefined | Undefined | Undefined |
|   | 1101 | 3 | Undefined | EV5 | 3-EV5 | Undefined | Undefined | Undefined | Undefined |
| 4 | 1110 | 5 | Undefined | Undefined | Undefined | DM5 | 2-DH5 | 8-DH5 | 100-DH5 |
|   | 1111 | 5 | Undefined | Undefined | Undefined | DH5 | 3-DH5 | 12-DH5 | 400-DH5 |

FIG. 10

METHOD AND SYSTEM FOR ESTABLISHING A WIRELESS COMMUNICATIONS LINK

FIELD OF THE INVENTION

The present invention relates to wireless communications. More particularly, the present invention relates to techniques for initiating wireless communications links.

BACKGROUND OF THE INVENTION

Since gaining approval by the Federal Communications Commission (FCC) in 2002, ultra wideband (UWB) techniques have become an attractive solution for short-range wireless communications because they allow for devices to exchange information at relatively high data rates.

Although UWB systems for short-range networks are relatively new, their transmission techniques have been known for decades. In fact, the first radio transmission was made by a UWB technique when Heinrich Hertz discovered radio waves in 1887. This discovery was made with a spark gap transmitter, which can be viewed as an early UWB radio. Later on, such transmitters were banned because they emitted wide spectrum transmissions.

Current FCC regulations permit UWB transmissions for communications purposes in the frequency band between 3.1 and 10.6 GHz. However, for such transmissions, the spectral density has to be under −41.3 dBm/MHz and the utilized bandwidth has to be higher than 500 MHz.

There are many UWB transmission techniques that can fulfill these requirements. A common and practical UWB technique is called impulse radio (IR). In IR, data is transmitted by employing short baseband pulses that are separated in time by gaps. Thus, IR does not use a carrier signal. These gaps makes IR much more immune to multipath propagation problems than conventional continuous wave radios. RF gating is a particular type of IR in which the impulse is a gated RF pulse. This gated pulse is a sine wave masked in the time domain with a certain pulse shape.

IR transmission facilitates a relatively simple transmitter design, which basically requires a pulse generator and an antenna. This design does not necessarily require a power amplifier, because transmission power requirements are low. In addition, this design does not generally require modulation components such as voltage controlled oscillators (VCOs) and mixers, because the impulses are baseband signals.

In general, IR receiver designs are more complex than their corresponding transmitter designs. However, these designs are much simpler than conventional receiver designs because they typically do not employ intermediate frequency (IF) signals or filters. However, to fulfill spectral requirements, IR impulses have to be very short in duration (e.g., a couple of nanoseconds). This requirement places stringent timing demands on receiver timing accuracy. The fulfillment of these demands can also provide IR receivers with accurate time resolution and positioning capabilities.

Existing FCC regulations require that a UWB capable device may only transmit UWB signals when it is associated with a receiver. Strictly interpreted, these regulations prohibit devices from sending UWB transmissions for the purpose of setting up a UWB connection. Thus, devices must use alternate transmission techniques to exchange information and parameters necessary to establish a UWB link. However, there is currently no presented solution as to how a UWB connection should be established.

Other short-range networks exist but do not provide the high data rates offered by UWB. One such network is Bluetooth. Bluetooth defines a short-range radio network, originally intended as a cable replacement. It can be used to create ad hoc networks of up to eight devices, where one device is referred to as a master device. The other devices are referred to as slave devices. The slave devices can communicate with the master device and with each other via the master device. The Bluetooth Special Interest Group, *Specification Of The Bluetooth System*, Volumes 1 and 2, Core and Profiles: Version 1.1, Feb. 22, 2001, describes the principles of Bluetooth device operation and communication protocols. This document is incorporated herein by reference in its entirety. The devices operate in the 2.4 GHz radio band reserved for general use by Industrial, Scientific, and Medical (ISM) applications. Bluetooth devices are designed to find other Bluetooth devices within their communications range and to discover what services they offer.

SUMMARY OF THE INVENTION

The present invention is directed to a method and system for establishing a wireless communications link. The method and system determine, through a first short-range communications link of a first type, whether a remote device is capable of supporting a short-range communications link of a second type. The method and system also exchange information with the remote device across the first communications link to establish a second short-range communications link of the second type. Once established, communications with the remote device across the second short-range communications link may commence.

Exchanging information with the remote device across the first communications link to establish the second communications link may include sending a request to the remote device across the first communications link. This request inquires whether the remote device desires to establish the second communications link. If the remote device so desires, an acknowledgement is received through the first communications link. When the first communications link is a Bluetooth link and the second communications link is a UWB link, this request may include a Bluetooth link manager protocol (LMP) message to the remote device.

In addition to the above features, the method and system may direct the remote device to start communicating across the second short-range wireless communications link. In cases where the first short-range communications link is a Bluetooth link and the second short-range communications link is a UWB link, this may include sending a Bluetooth LMP message to the remote device. This LMP message is adapted to direct the remote device to begin accepting transmissions across the UWB link and may include one or more UWB parameters.

The method and system may also establish the first short-range communications link with the remote device. When the first link is a Bluetooth link, this may include performing a Bluetooth paging process with the remote device.

The present invention is also directed to a wireless communications device. This device includes a first segment that exchanges information with a remote device across a first short-range wireless communications link of a first type. In addition, the device includes a host that is coupled to the first segment. The host sets up a second short-range wireless communications link of a second type by causing the first segment to exchange information with the remote device across the first communications link. This information includes one or more parameters of the second short-range communications link. In addition, the device includes a second segment adapted to exchange information with the remote device across the second communications link.

As with the method and system of the present invention, the first communications link may be a Bluetooth link and the second communications link may be a UWB link. Accordingly, the first segment of the device may include a link manager that exchanges one or more Bluetooth LMP messages with the remote device. These messages may include a message to direct the remote device to begin accepting transmissions across the UWB link, a message to inquire whether the remote device desires to establish the UWB link, and/or a message to determine whether the remote device is capable of supporting the UWB link. These messages may each include one or more UWB parameters.

The present invention advantageously allows a UWB link to be established without transmitting UWB signals. Thus, Bluetooth may be used to establish UWB links. Since Bluetooth is viewed as a technology that will be soon be implemented in most phones and consumer electronic devices, devices having UWB capabilites will also be Bluetooth equipped. Accordingly, the present invention advantageously provides for the integration of Bluetooth and UWB capabilities A computer-readable medium may be encoded with processing instructions for implementing the various method and functions herein, such as establishing a wireless communications link, to be performed by a computerized system which can be embodied in wireless communications device.

Further features and advantages of the present invention will become apparent from the following description.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIG. 10 is an exemplary packet type table;

DETAILED DESCRIPTION OF THE PREFERRED EMBODIMENTS

I. Operational Environment

Figure 1:
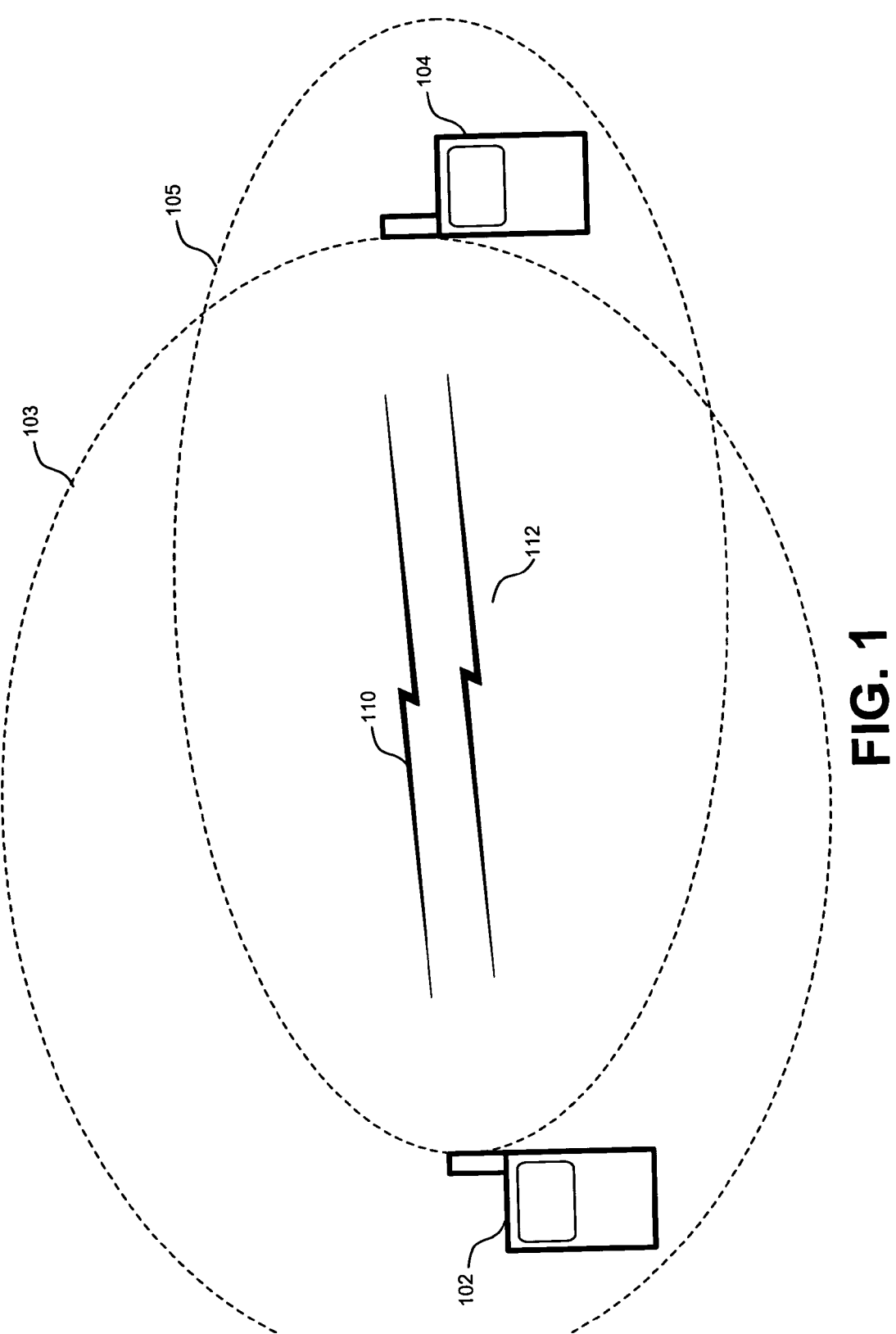
FIG. 1 is a diagram of an exemplary operational environment.

Before describing the invention in detail, it is helpful to describe an environment in which the invention may be used. Accordingly, FIG. 1 is a diagram of an operational environment which includes wireless communications devices 102 and 104.

Devices 102 and 104 are capable of engaging in wireless communications via at least two different types of short-range wireless links. For example, devices 102 and 104 may support both Bluetooth and UWB links.

Devices 102 and 104 each have a communications range that is defined by a coverage area. As shown in FIG. 1, a coverage area 103 defines the communications range of device 102, while a coverage area 105 defines the communications range of device 104. These coverage areas illustrate a range in which the corresponding device can communicate across two different link types (e.g., both Bluetooth and UWB).

In the environment of FIG. 1 devices 102 and 104 are within each other's communications ranges. Accordingly, a first wireless communications link 110 and a second wireless communications link 112 are established between devices 102 and 104. These links may be of different types. For instance, first link 110 may be a Bluetooth link, while second link 112 may be a UWB link.

According to the present invention, first device 102 may communicate across first link 110 to establish second link 112, and to initiate communications across link 112.

II. Wireless Communications Device

Figure 2:
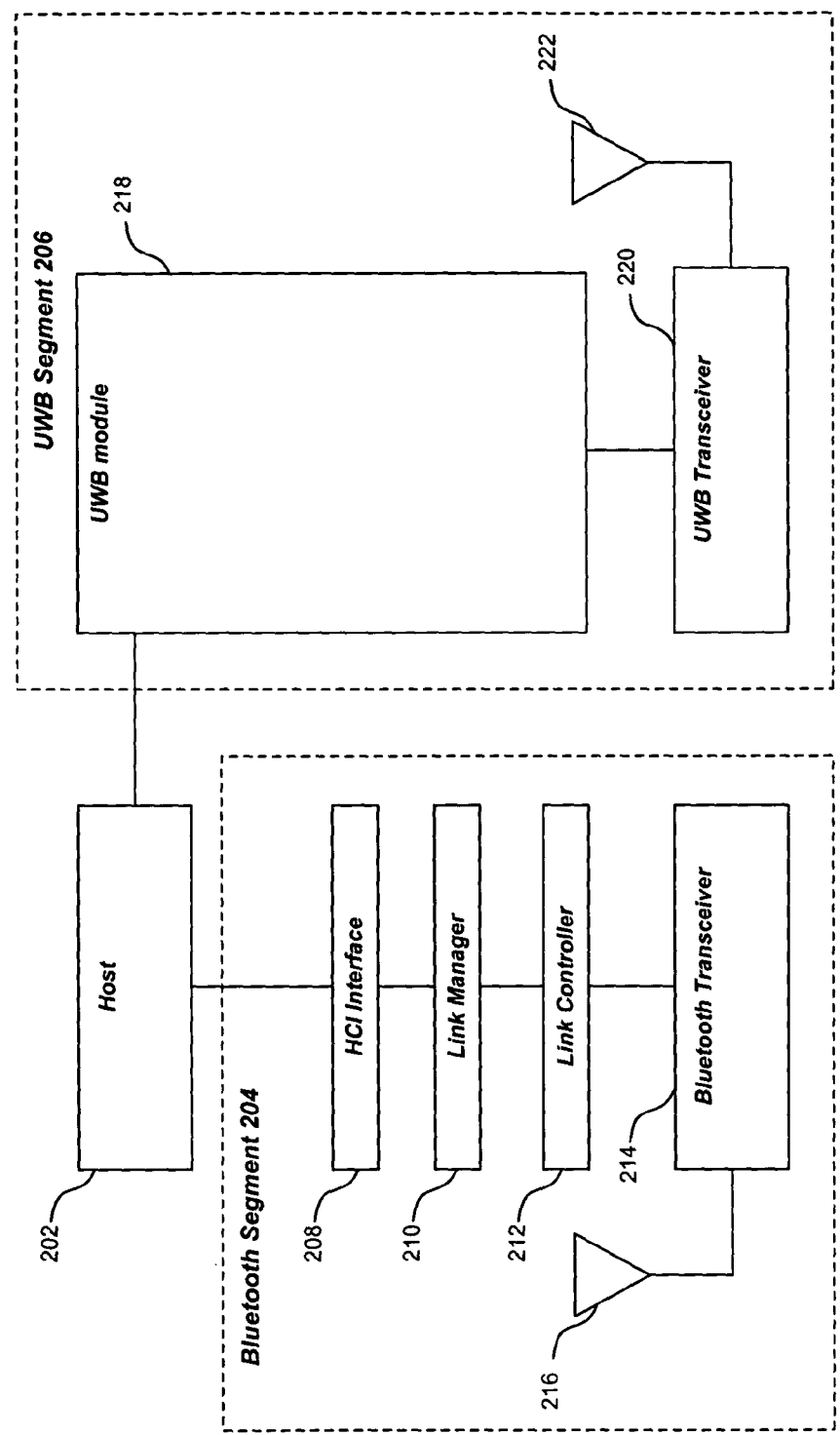
FIG. 2 is a block diagram of an exemplary communications device architecture in accordance with one embodiment.

FIG. 2 is a block diagram showing a wireless communications device architecture, which may be used for devices 102 and 104. Although this architecture is described in the context of Bluetooth and UWB communications, it may be employed with other wireless communications technologies.

The device architecture of FIG. 2 includes a host 202, which is coupled to a Bluetooth segment 204, and a UWB segment 206. Host 202 is responsible for functions involving user applications and higher protocol layers, while Bluetooth segment 204 and UWB segment 206 are responsible for lower layer protocols. More particularly, Bluetooth segment 204 is responsible for Bluetooth specific communications with other devices, and UWB segment 206 is responsible for UWB specific communications with other devices.

As shown in FIG. 2, Bluetooth segment 204 includes a host controller interface (HCI) 208, a link manager 210, a link controller 212, a Bluetooth transceiver 214, and an antenna 216.

Link manager 210 performs functions related to Bluetooth link set-up, security and control. These functions involve discovering corresponding link managers at remote devices and communicating with them according to a link manager protocol (LMP). To perform these functions, LMP defines a set of messages, which are also referred to as protocol data units (PDUs). Link manager 210 exchanges these PDUs with link managers at remote devices. Various LMP PDUs for performing the techniques of the present invention are described below with reference to FIG. 6.

Link manager 210 exchanges information with host 202 across HCI 208. This information may include commands received from host 202, and information transmitted to host 202. HCI 208 defines a set of messages, which provide for this exchange of information. Various HCI messages for performing the techniques of the present invention are described below with reference to FIG. 6.

Link controller 212 operates as an intermediary between link manager 210 and Bluetooth transceiver 214. Link controller 212 also performs baseband processing for Bluetooth transmission, such as error correction encoding and decoding. In addition, link controller 212 exchanges data between corresponding link controllers at remote devices according to physical layer protocols. Examples of such physical layer protocols include retransmission protocols such as the automatic repeat request (ARQ) protocol.

FIG. 2 shows that Bluetooth transceiver 214 is coupled to an antenna 216. Transceiver 214 includes electronics that allow the device of FIG. 2 (in conjunction with antenna 216) to exchange wireless Bluetooth signals with devices, such as remote device 104. Such electronics include modulators and demodulators, amplifiers, and filters.

When the device of FIG. 2 engages in UWB communications, it employs the services of UWB segment 206. As shown in FIG. 2, UWB segment 206 includes a UWB module 218, a UWB transceiver 220, and an antenna 222.

UWB module 218 provides for the exchange of information across UWB links according to one or more protocol layers. For example, UWB module may provide session management functionality to manage various UWB sessions. In addition, UWB module 218 may perform baseband processing, such as error correction encoding and decoding. In addition, UWB module 218 perform various link level protocols with remote devices according to physical layer protocols. Examples of such protocols include retransmission protocols such as the automatic repeat request (ARQ) protocol.

UWB transceiver 220 is coupled to antenna 222. UWB transceiver 220 includes electronics, which allow the device of FIG. 2 (in conjunction with antenna 222) to exchange wireless UWB signals with devices, such as remote device 104. For the transmission of UWB signals, such electronics may include a pulse generator. For the reception of UWB signals, such electronics may include timing circuitry and filters.

Figure 3:
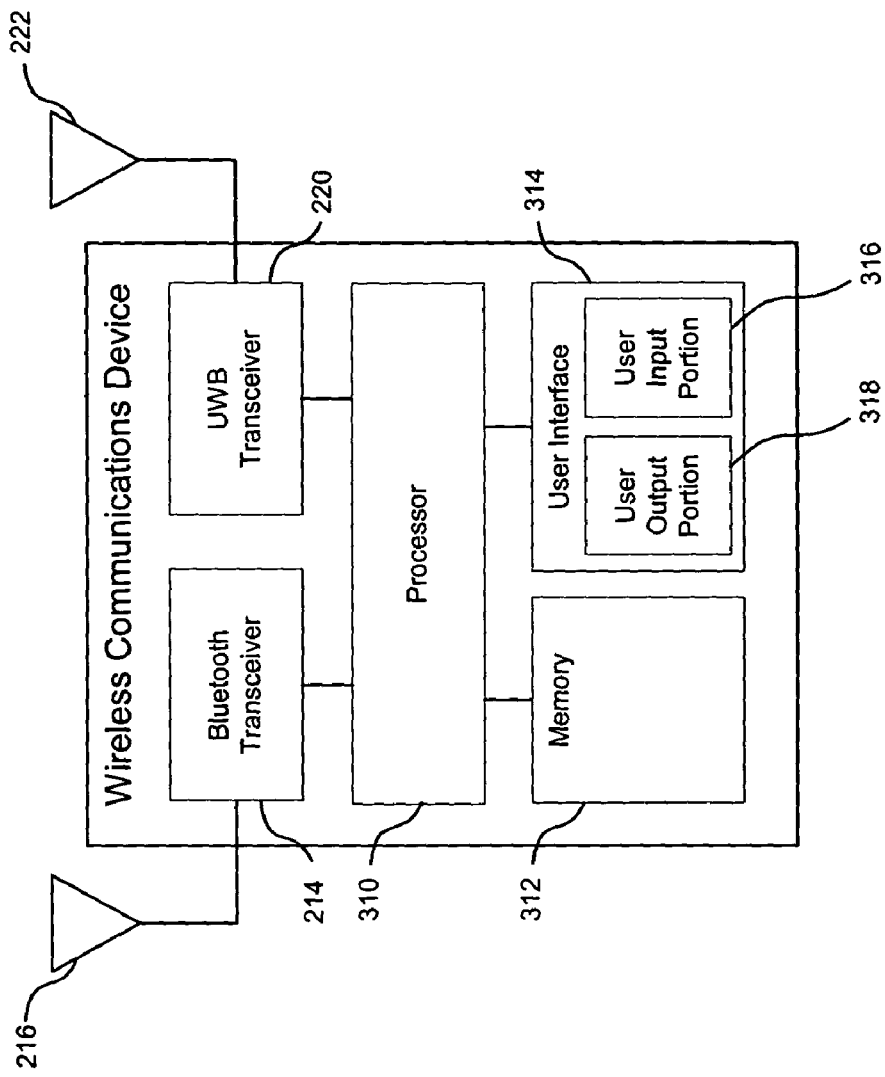
FIG. 3 is a block diagram of an exemplary communications device implementation.

The architecture of FIG. 2 may be implemented in hardware, software, firmware, or any combination thereof. One such implementation is shown in FIG. 3. This implementation includes a processor 310, a memory 312, and a user interface 314. In addition, the implementation of FIG. 3 includes Bluetooth transceiver 214, antenna 216, UWB transceiver 220, and antenna 222. Transceivers 214 and 220 may be implemented as described above with reference to FIG. 2.

As shown in FIG. 3, processor 310 is coupled to transceivers 214 and 220. Processor 310 controls device operation. Processor 310 may be implemented with one or more microprocessors that are each capable of executing software instructions stored in memory 312.

Memory 312 includes random access memory (RAM), read only memory (ROM), and/or flash memory, and stores information in the form of data and software components (also referred to herein as modules). These software components include instructions that can be executed by processor 310. Various types of software components may be stored in memory 312. For instance, memory 312 may store software components that control the operations of transceivers 214 and 220. Also, memory 312 may store software components that provide for the functionality of host 202, HCI interface 208, link manager 210, link controller 212, and UWB module 218.

In addition, memory 312 may store software components that control the exchange of information through user interface 314. As shown in FIG. 3, user interface 314 is also coupled to processor 310. User interface 314 facilitates the exchange of information with a user. FIG. 3 shows that user interface 314 includes a user input portion 316 and a user output portion 318. User input portion 316 may include one or more devices that allow a user to input information. Examples of such devices include keypads, touch screens, and microphones. User output portion 318 allows a user to receive information from WCD 102. Thus, user output portion 318 may include various devices, such as a display, and one or more audio speakers. Exemplary displays include liquid crystal displays (LCDs), and video displays.

The elements shown in FIG. 3 may be coupled according to various techniques. One such technique involves coupling transceivers 214 and 220, processor 310, memory 312, and user interface 314 through one or more bus interfaces. In addition, each of these components is coupled to a power source, such as a removable and rechargeable battery pack (not shown).

III. Link Establishment

Figure 4:
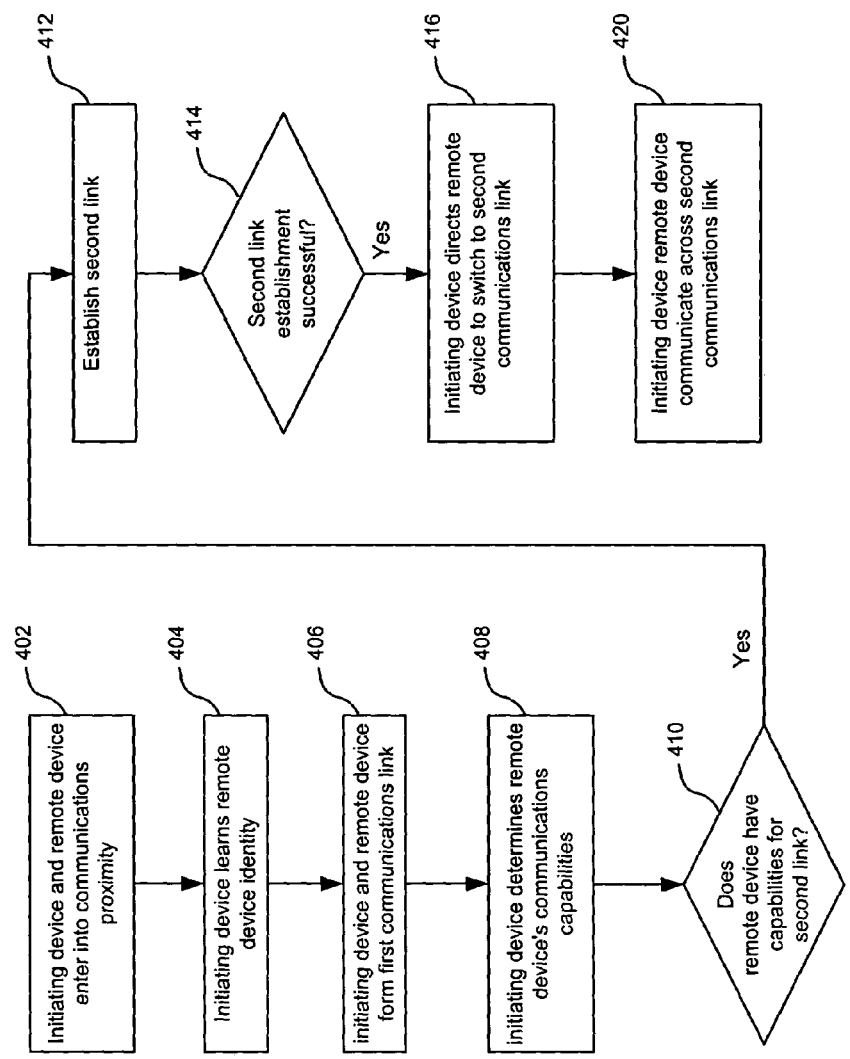
FIG. 4 is a flowchart of an exemplary link establishment process.

FIG. 4 is a flowchart of a link establishment process according to the present invention. In this process, an initiating device (such as device 102) uses a first communications link with a remote device (such as device 104) to establish a second communications link with the remote device. These communications links may be of different types. For example, the first communications link may be a Bluetooth link, while the second communications link may be a UWB link.

This process begins with a step 402, in which the initiating device and the remote device enter into short-range communications proximity. Next, in a step 404, the initiating device learns the identity (or discovers the existence) of the remote device. This step may comprise the initiating device and the remote device engaging in an inquiry process. In Bluetooth implementations, the initiating device operates in an inquiry state while the remote device operates in an inquiry scan state. When operating in the inquiry state, the initiating device transmits an inquiry packet and the remote device listens for inquiry packets.

When the remote device receives the inquiry packet from the initiating device, it transmits one or more frequency hop synchronization (FHS) packets, which are received by the initiating device. The FHS packet(s) allow the initiating device to become synchronized with the hop sequence of the remote device. In addition, the FHS packet(s) enable the initiating device to derive information necessary to make a Bluetooth connection with the remote device. This information includes the native clock of the remote device (CLKN), the Bluetooth address (BD_ADDR) of the remote device, and error correction coding information.

In a step 406, the initiating device and the remote device join an ad hoc network to form the first communications link. Accordingly, when the first communications link is a Bluetooth link, this step may comprise the initiating device and the remote device performing a paging process. Upon successful completion, the paging process results in an unsecured connection being established between these devices. Bluetooth paging involves the exchange of various information between the initiating device (which is in a paging state) and remote device (which is in a page scan state).

More particularly, the initiating device enters the paging state and transmits one or more paging packets. Each of these paging packets includes an identification number based on the address of the remote device. Meanwhile, the remote device (which is in the page scan state) responds to the paging packets by transmitting a packet containing its address.

The initiating device receives this packet from the remote device. In response, the initiating device transmits a frequency hop synchronization (FHS) packet. The FHS packet is used to pass information that allows the remote device to synchronize with the frequency hopping sequence of the initiating device. Upon receipt of this FHS packet, the remote device transmits a further packet to confirm receipt of the FHS packet.

At this point, a Bluetooth link is formed between the initiating device and the remote device. Accordingly, both devices enter into a connection state. In the connection state, the initiating device operates as a master device and the remote device operates as a slave device. Thus, the remote device employs the timing and frequency hopping sequence of the initiating device. Additionally, the initiating device transmits a packet to verify that a link has been set up. The remote device confirms this link by sending a packet to the initiating device.

In a step 408, the initiating device determines the communications capabilities of the remote device. This step may comprise these devices exchanging one or more messages, such as a request for the capabilities of the remote device and a response containing these capabilities. These capabilities may be communicated in the form of link type identifiers and their associated transmission formats (e.g., UWB radio standard and version).

In a step 410, the initiating device determines whether the remote device is capable of forming the second link. For example, this step may comprise the initiating device determining whether the remote device has UWB communications capabilities. If so, then operation proceeds to a step 412. In step 412, the initiating device initiates a second link establishment process. An exemplary operation of this step is described below with reference to FIG. 5.

As indicated by a step 414, if this link establishment process is successful, then the initiating device may direct the remote device to start communicating across the second link in a step 416.

Figure 5:
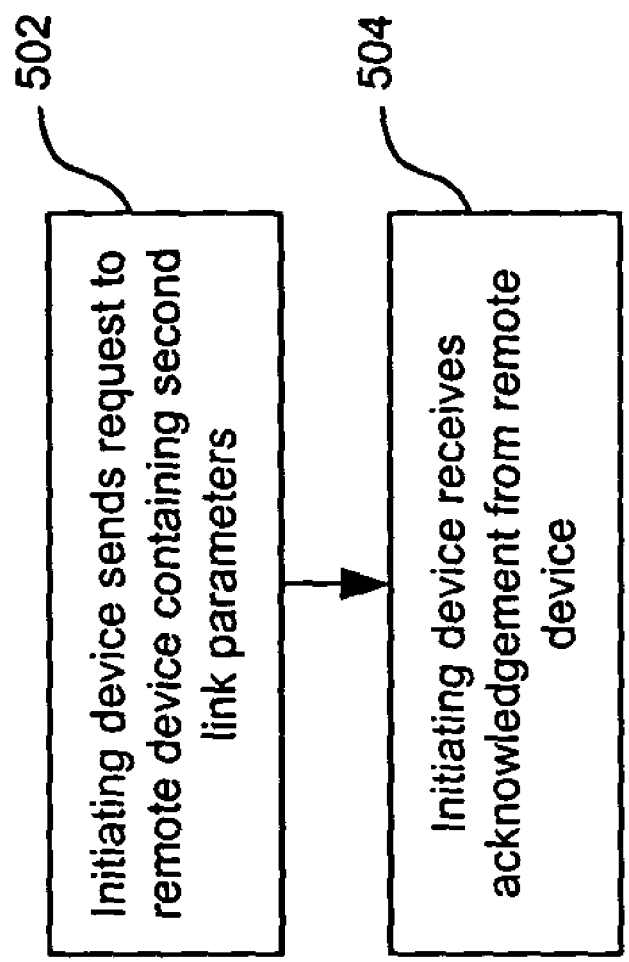
FIG. 5 is a flowchart of a second communications link initiation.

A step 420 follows step 416. In this step, the initiating device and the remote device may engage in communications across the second link FIG. 5 is a flowchart illustrating a performance of step 412 in greater detail. This performance begins with a step 502. In this step, the initiating device sends a request to the remote device over the first communications link. This request asks the remote device whether it desires to establish the second link. In addition, this request contains parameters for the second link. These parameters may include, for example, transmission format (e.g., UWB radio standard and version), and traffic classes.

When the first link is a Bluetooth link, this request may include an LMP message, such as the LMP_host_connection_request_ext PDU, which is described below in greater detail.

In a step 504, the initiating device receives an acknowledgement transmitted by the remote device. This acknowledgement is transmitted across the first link and indicates that the remote device desires to establish the second communications link. When the first link is a Bluetooth link, this acknowledgement may be in the form of an LMP message, such as a LMP_setup_complete message. At this point, the second communications link is set up (or configured).

IV. Bluetooth Messages

As described above, embodiments of the present invention may employ Bluetooth communications to initiate UWB communications. However, current Bluetooth standards do not provide a mechanism for establishing UWB connections. Therefore, the present invention provides for additional and modified Bluetooth messages that may be employed in establishing UWB communications. These messages include LMP PDUs and HCI commands. An exemplary set of such messages are provided below in Table 1. A description of these messages follows this table.

TABLE 1

| LMP messages | HCI messages |
| --- | --- |
| LMP_features_req_ext (modified message) | HCI_create_connection_req (modified message) |
| LMP_features_res_ext (modified message) | HCI_connection_request_event (modified message) |
| LMP_host_connection_request (modified message) | HCI_connection_complete_event (modified message) |
| LMP_switch_to_UWB_link_req (new message) | |

Table 1 provides a listing of an exemplary set of modified or new LMP messages according to an embodiment of the present invention. As indicated by this table, LMP_features_req_ext and LMP_features_res_ext are modified messages of the present invention. These messages are based on the standard Bluetooth PDUs LMP_features_req and LMP_features_res.

These standard Bluetooth PDUs are exchanged to determine the features supported by a particular device. In particular, a first device transmits a LMP_features_req PDU to a second device. This PDU may be transmitted at any time after the two devices have completed a paging process. In response to the LMP_features_req PDU, the second device transmits a LMP_features_res PDU, which conveys the features that it supports.

LMP_features_req and LMP_features_res each includes a features parameter, which conveys the features supported by the transmitting device in a bitmap. This bitmap includes multiple bits, each bit corresponding to a particular radio, baseband, or LMP feature. According to the present invention, the features parameter of the LMP_features_req_ext and LMP_features_res_ext PDUs, has an extended bitmap. This extended bitmap, includes a UWB capable bit as well as UWB information bits, which convey associated information, such as particular UWB operational parameters that are supported. Examples of such operational parameters include transmission format (e.g., UWB radio standard and version) and traffic classes.

As indicated by Table 1, the present invention provides for a new LMP_switch_to_UWB_link_req PDU. This PDU is a directive that first UWB capable device may transmit to a second UWB capable device to direct the second device to commence accepting transmissions across a UWB link. This message may include parameters of the UWB link so that a receiving device may configure itself to receive and/or send UWB transmissions. Examples of such parameters include transmission format (e.g., UWB radio standard and version) and traffic classes.

Upon receipt of this message, the second UWB capable device sends the first device a Bluetooth LMP_accepted PDU so that the first device may initiate UWB communications.

The present invention also provides for a LMP_host_connection_req_ext message. LMP_host_connection_req is a standard Bluetooth LMP PDU. This PDU indicates that a device wishes to create a connection with another device involving protocol layers above the link manager layer. According to the present invention, LMP_host_connection_req_ext is an extension of LMP_host_connection_req. This extension provides parameter values and/or parameters to indicate that a device wishes to establish a UWB link with another device. For instance, such parameter values and/or parameters may convey information such as transmission format (e.g., UWB radio standard and version) and traffic classes.

Table 1 also provides a listing of HCI commands according to an embodiment of the present invention. As indicated by this table, the present invention provides for a modified HCI_create_connection_req command. The standard Bluetooth HCI command instructs the link manager of a local Bluetooth device to create a connection with a remote Bluetooth device. In particular, this command instructs the link manager of the local Bluetooth device to initiate a paging process with the remote device. This command includes the following parameters: BD_ADDR, Packet_Type, Page_Scan_Repetition_Mode, Page_Scan_Mode, Clock_Offset, and Allow_Role_Switch. These parameters are described below.

The BD_ADDR parameter specifies the Bluetooth device address (BD_ADDR) of the remote device. The Packet_Type parameter specifies which packet types the link manager shall use for the connection. The Page_Scan_Repetition_Mode and Page_Scan_Mode parameters indicate page scan modes supported by the remote device. The Clock_Offset parameter indicates a difference between the local device's clock and the clock of the remote device with BD_ADDR. The Allow_Role_Switch parameter indicates whether the local device accepts or rejects the request of a master-slave role switch.

According to the present invention, a modified HCI_create_connection_req command provides for a UWB value for the Packet_Type parameter. Thus, this modified HCI command instructs a link manager at a local device to pursue a UWB connection with a remote device specified by the BD_ADDR parameter.

The present invention also provides for a modified HCI_connection_request_event command. At a remote device, this command is passed from the link manager to the host. The standard Bluetooth HCI_connection_request_event command includes a BD_ADDR parameter, a Class-of-Device parameter, and a Link_Type parameter. These parameters specify information regarding a device which is trying to establish a connection through a HCI_create_connection_req command.

A modified HCI_connection_request_event command of the present invention provides for values which convey UWB information to be included in the Class-of_Device and Link_Type parameters. In further embodiments, additional modifications to this command may exist, such as the creation of other parameters.

At both the local and remote devices, the HCI_connection_complete_event message provides an indication to the hosts that a new connection has been established. The standard Bluetooth HCI_connection_complete_event message includes a Status parameter, a Connection_Handle parameter, a BD_ADDR parameter, a Link_Type parameter, and an Encryption_Mode parameter. In an embodiment of the present invention, the Link_Type parameter is modified to include a value to indicate that a UWB link has been completed.

V. Device Interactions

Figure 6:
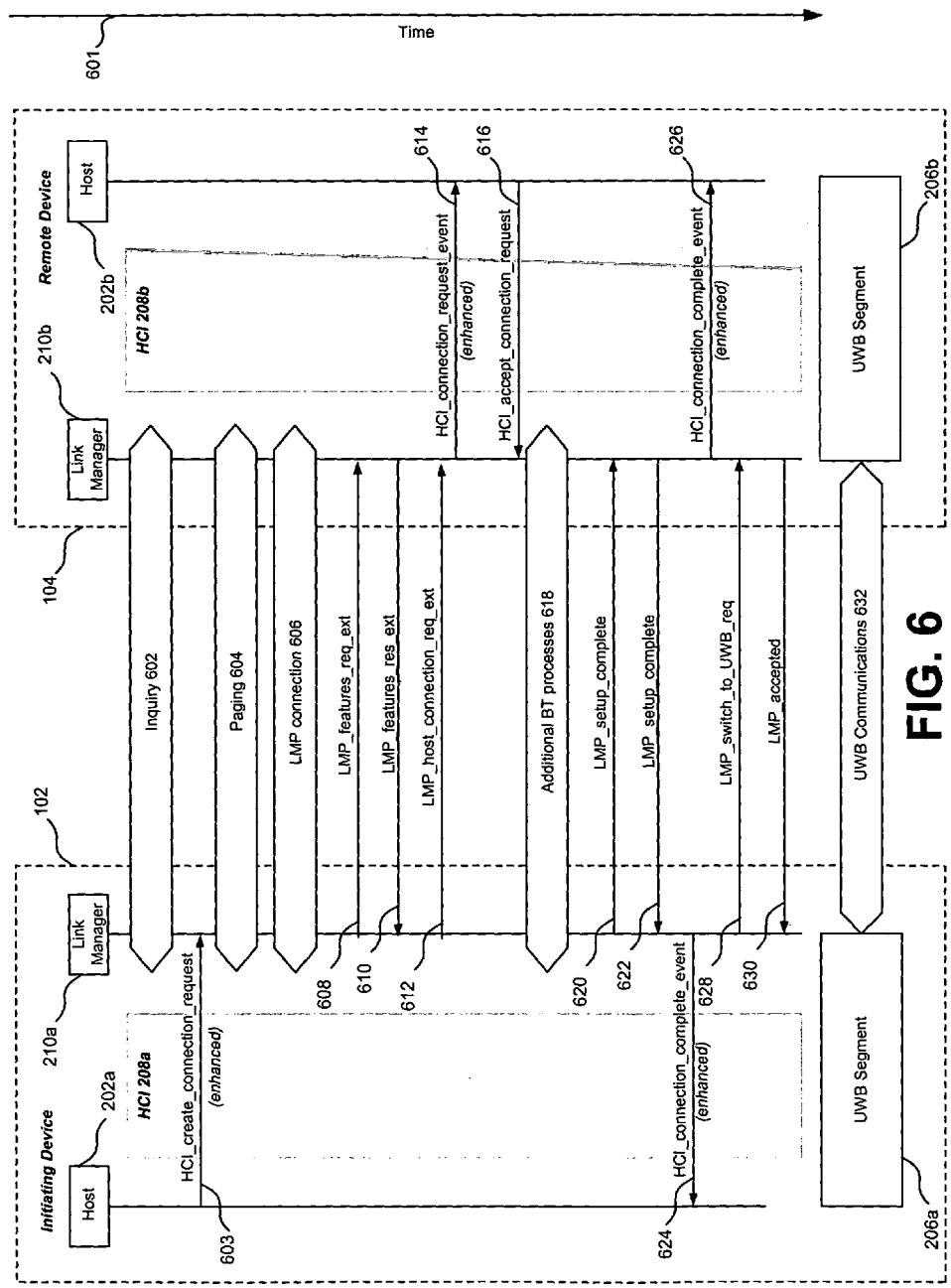
FIGS. 6-8 are diagrams of interactions between two devices according to the present invention.

FIG. 6 illustrates an interaction between Bluetooth and UWB capable devices involving the messages of Table 1. This diagram is described with reference to the operational environment of FIG. 1. However, this interaction may be performed in other environments.

As shown in FIG. 6, initiating device 102 includes a host 202*a*, a link manager 210*a*, an HCI 208*a*, and a UWB segment 206*a*. Similarly, remote device 104 includes a host 202*b*, a link manager 210*b*, an HCI 208*b*, and a UWB segment 206*b*. Although not shown, devices 102 and 104 may each include a link controller 212 to handle baseband processing and information exchange as described above with reference to FIG. 2.

The interaction of FIG. 6 includes a series of events that occur in a chronological sequence according to a time axis 601. This interaction begins with an inquiry process 602. In this process, initiating device 102 learns the identity of remote device 104.

Next, terminal host 202*a* sends message 603 to link manager 210*a*. As shown in FIG. 6, message 603 is a HCI_create_connection_req, which is modified as described above. In addition, message 603 includes the BD_ADDR of remote device 104. Thus, this message instructs link manager 210*a* to pursue a UWB connection with remote device 104.

In response to this request, link manager 210*a* initiates a paging process 604 with remote device 104. This paging process results in a link manager protocol (LMP) connection 606 being established between link managers 210*a* and 210*b*. Once LMP connection 606 is established, link manager 210*a* transmits LMP_features_req_ext message 608 to link manager 210*b*. As described above, this message inquires about the features supported by remote device 104. In response, link manager 210*b* sends LMP_features res_ext message 610 to link manager 210*b*. Message 610 conveys the features supported by remote device 104.

If message 610 indicates that remote device 104 supports acceptable UWB capabilities, then link manager 210*a* sends LMP_host_connection_req_ext message 612 to link manager. As described above, this message is an extended Bluetooth message indicating that initiating device 102 wishes to create a UWB connection with remote device 104.

Upon receipt of message 612, link manager 210*b* sends a message 614 to terminal host 202*b* across HCI 208*b*. Message 614 is an HCI_connection_request_event message, which is modified in the manner described above. Thus, message 614 includes parameter values which convey UWB information.

After message 614 is received, terminal host 202*b* may agree to establish a UWB connection with initiating device 102. If so, then terminal host 202*b* sends a message 616 to link manager 210*b* across HCI 208*b*. As shown in FIG. 6, message 616 is a standard Bluetooth HCI_accept_connection_request message.

As a result of message 616, devices 102 and 104 may engage in additional Bluetooth processes, as indicated by event 618. Examples of such additional Bluetooth processes include a master/slave switch and an authentication process. A master/slave switch is a process in which the master and slave roles of devices 102 and 104 are exchanged. Authentication is a process where two devices verify that they both have the same secret key. This secret key can then be used to effect security features, such as link encryption.

Following these additional Bluetooth processes, FIG. 6 shows that link managers 210a and 210b exchange Bluetooth LMP_setup_complete messages 620 and 622. The exchange of these messages indicates that the exchange of information between devices 102 and 104 for setting up a UWB link is complete.

Next, at initiating device 102, link manager 210a sends a message 624 to host 202a across HCI 208a. Also, at remote device 104, link manager 210b sends a message 626 to host 202b across HCI 208b. Messages 624 and 626 are each HCI_connection_complete_event messages. As shown in FIG. 6, these messages are modified as described above such that the Link_Type parameter includes a value indicating that a UWB link has been completed.

Following messages 624 and 626, link manager 210a sends to link manager 210b LMP_switch_to_UWB_link_req message 628. As described above, this message is a new message that requests remote device 104 to commence communications across the established UWB link. If the remote device 104 accepts this request, it sends initiating device 102 LMP_accepted message 630.

As shown in FIG. 6, after link manager 210a receives LMP_accepted message 630, devices 102 and 104 commence UWB communications, as indicated by interaction 632.

Although not shown, the interaction of FIG. 6 may include additional messages. For example, following the receipt of message 628, link manager 210b of remote device 104 may send one or more HCI messages to host 202b. These messages indicate to host 202b that UWB transmissions are forthcoming. Upon receipt of such messages, host 202b may send one or more messages to UWB segment 206b directing it to prepare for the reception of UWB transmissions.

Also, following receipt of message 630, link manager 210a of initiating device 102 may send one or more HCI messages to host 202a. These messages indicate to host 202b that UWB transmissions may commence. In response to such messages, host 202a may send one or more messages to UWB segment 206a, which causes it to initiate UWB transmissions.

VI. Further Interactions

Figure 7:
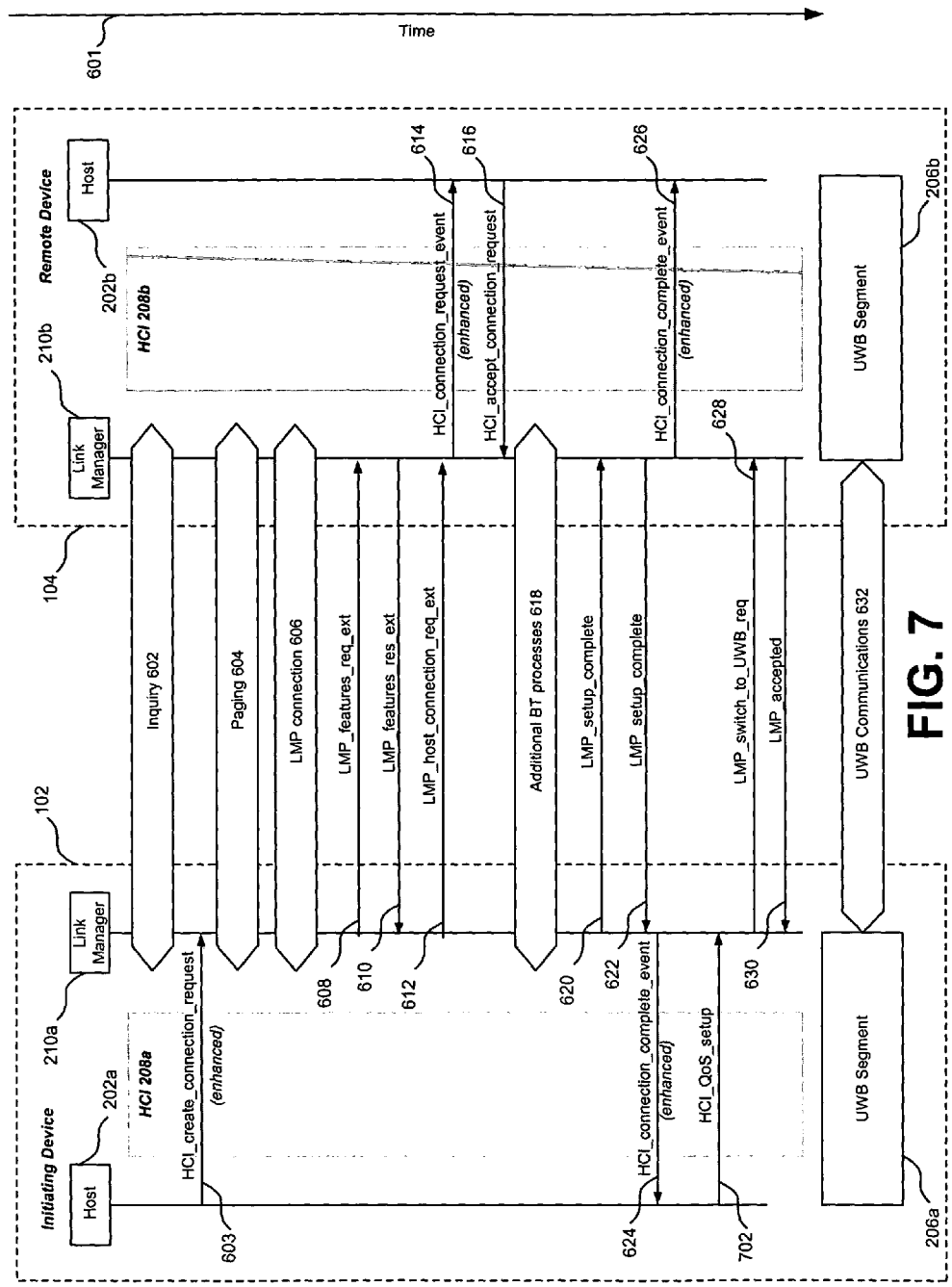

FIG. 7 is a diagram illustrating a further interaction between devices in which a Bluetooth link is used to establish a UWB link. This interaction is similar to the interaction of FIG. 6. However, this interaction additionally includes host 202a sending to link manager 210a an HCI_QoS_setup message 702. This message is a standard Bluetooth message which specifies quality of service parameters, such as peak bandwidth, for a particular connection.

At the time in which message 702 is transmitted, the UWB link has been assigned a connection handle. Specific QoS requirements, like peak bandwidth is mapped to this connection handle. Message 702 assigns a large peak bandwidth to this connection handle. This signifies that a switch to UWB communications is desired. Accordingly, in response to receiving message 702, link manager 210a sends message 628. As described above, this message requests remote device 104 to commence communications across the established UWB link.

Figure 8:
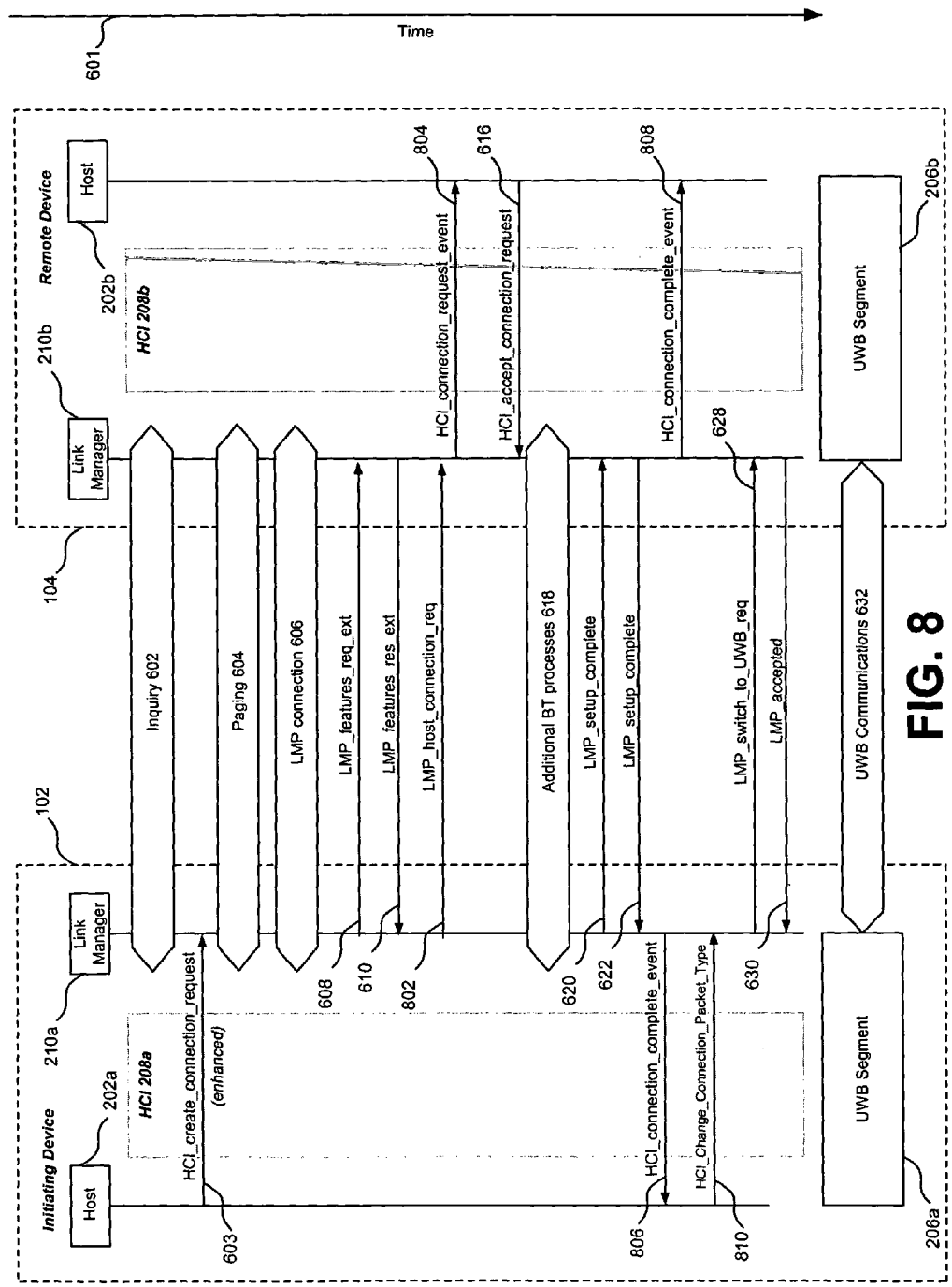

FIG. 8 shows yet a further interaction between devices according to the present invention. This interaction is also similar to the interaction of FIG. 6. However, in this interaction, messages 612, 614, 624, and 626 are replaced with messages 802, 804, 806, and 808, respectively. Further, this interaction includes an additional message 810.

Message 802 is a standard Bluetooth LMP_host_connection_req message, which indicates that initiating device 102 wishes to create a Bluetooth connection with remote device 104. Message 804 is a standard Bluetooth HCI_connection_request_event command, which specifies information regarding initiating device 104. Messages 806 and 808 are standard Bluetooth HCI_connection_complete_event messages.

Accordingly, the interaction of FIG. 8 in large part begins with normal Bluetooth connection establishment processes. However, following message 806 and 808, message 810 initiates the setup of a UWB link. Message 810 is a modified HCI_Change_Connection_Packet_Type command. This modified command includes values for its packet type parameter that designates a UWB link (as well as its corresponding parameters). Accordingly, in response to receiving message 810, link manager 210a transmits message 628 to remote device 104 to commence communications across a UWB link.

VII. Further Architectural and Implementation Features

In accordance with aspects of the present invention, UWB or other High Bit Rate (High Rate or HR) wireless transmissions may be handled as a part of a Bluetooth piconet, employing wireless device architectures such as the architecture described below with reference to FIG. 9. In this example, UWB/HR radio transmissions may be scheduled as Bluetooth transmissions in a time division manner that employs the timing of the Bluetooth slot structure. The UWB/HR link may be established in a link level by employing a framework presented in release after Bluetooth Version 1.2.

Specifically, as part of a medium rate data extension, release after Bluetooth Version 1.2 provides for the exchange of packet type requests and responses, which communicate link and packet type capabilities of a device. Different modulation and radio implementations can be provided by existing LMP packet type request and response commands (i.e., LMP_packet_typereq and LMP_packet_type_res), involving addresses (e.g., logical transport address or LT_ADDR) and packet type table (ptt) entries chosen according to desired modulation/radio characteristics.

Specifically, the logical transport address may be selected according to the Bluetooth Address (BD_ADDR) and the packet type table may be extended to include HR data and UWB data along with basic rate data and medium rate data. Accordingly, UWB and other higher rate links may be established by employing mechanisms provided by release after Bluetooth Version 1.2 while retaining backwards compatibility and reducing complexity in the development of media access control (MAC) to support the additional links.

Figure 9:
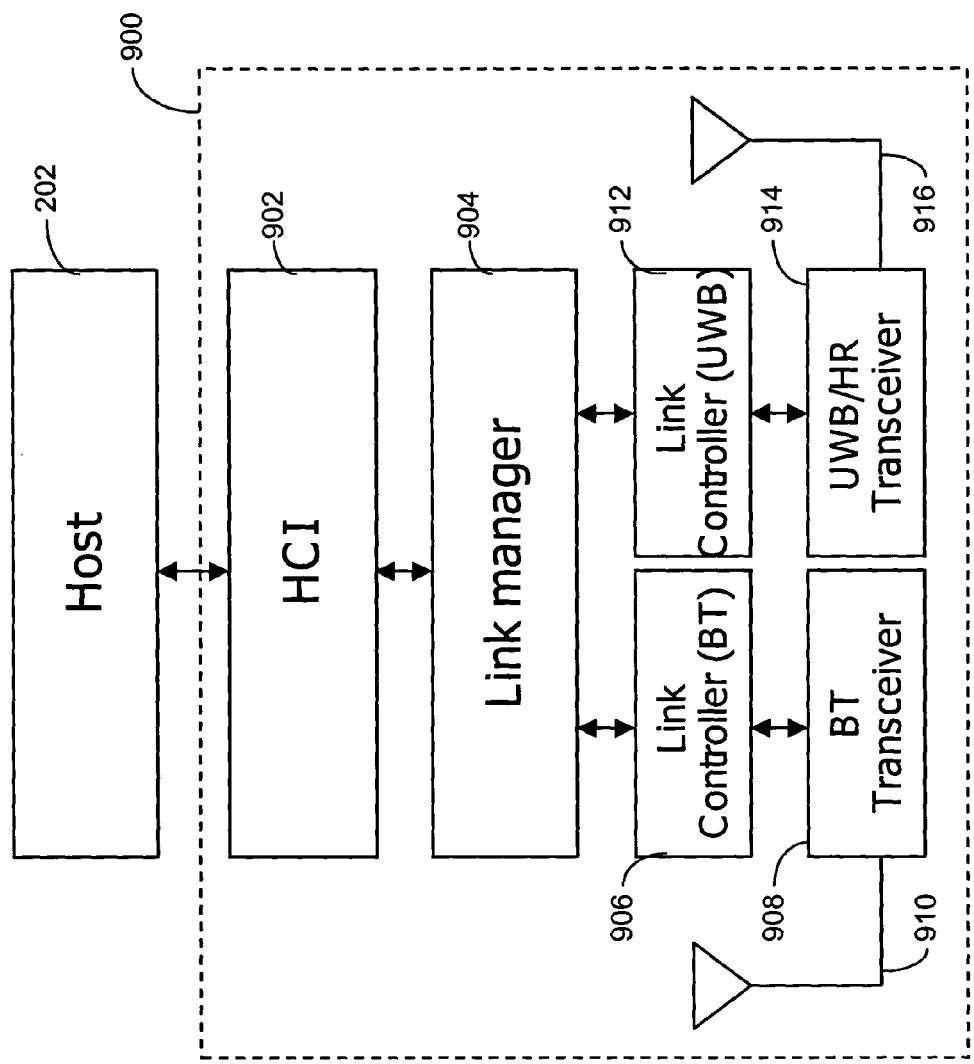
FIG. 9 is an exemplary communications device architecture in accordance with a further embodiment.

FIG. 9 is a block diagram showing a wireless communications device architecture, which may be used for devices 102 and 104, in accordance with the present invention. This architecture may be employed with the various systems and methods described above for establishing UWB links through Bluetooth communications. In addition, this architecture may employ packet type table techniques described in this section and with reference to FIGS. 11 and 12. Although this architecture is described in the context of Bluetooth and UWB communications, it may be employed with other wireless communications technologies.

The device architecture of FIG. 9 includes a host 202, which is coupled to a segment 900. Host 202 is responsible for functions involving user applications and higher protocol layers, while segment 900 is responsible for lower layer protocols, such as Bluetooth (e.g., basic rate, medium rate or higher rate), UWB, and/or other specific communications.

As shown in FIG. 9, segment 900 includes a host controller interface (HCI) 902, a link manager 904, a Bluetooth (BT) link controller 906, a Bluetooth (BT) transceiver 908, an antenna 910, a UWB link controller 912, a UWB/HR transceiver 914, and an antenna 916.

Link manager 904 performs functions related to Bluetooth link and UWB link set-up, security and control. These functions involve discovering corresponding link managers at remote devices and communicating with them according to the link manager protocol (LMP). More particularly, link manager 904 exchanges LMP PDUs with link managers at remote devices. LMP PDUs for performing the techniques of the present invention are described herein with reference to FIGS. 6, 11, and 12.

Link manager 904 exchanges information with host 202 across HCI 902. This information may include commands received from host 202, and information transmitted to host 202. HCI 902 defines a set of messages, which provide for this exchange of information.

BT link controller 906 operates as an intermediary between link manager 904 and BT transceiver 908. Link controller 906 also performs baseband processing for Bluetooth transmissions, such as error correction encoding and decoding. In addition, link controller 906 exchanges data between corresponding link controllers at remote devices according to physical layer protocols. Examples of physical layer protocols include retransmission protocols such as the automatic repeat request (ARQ) protocol.

BT transceiver 908 is coupled to antenna 910. Transceiver 908 includes electronics to (in conjunction with antenna 910) exchange wireless Bluetooth signals with devices, such as remote device 104. Such electronics include modulators, demodulators, amplifiers, and filters.

UWB link controller 912 operates as an intermediary between link manager 904 and UWB/HR transceiver 914. Link controller 912 also performs baseband processing for UWB transmission, such as error correction encoding and decoding. In addition, link controller 912 exchanges data between corresponding link controllers at remote devices according to physical layer protocols. Examples of such physical layer protocols include retransmission protocols such as the automatic repeat request (ARQ) protocol.

UWB/HR transceiver 914 is coupled to an antenna 916. Transceiver 914 includes electronics to (in conjunction with antenna 916) exchange wireless UWB or HR signals with devices, such as remote device 104. For the transmission of UWB signals, such electronics may include a pulse generator. For the reception of UWB signals, such electronics may include timing circuitry and filters.

FIG. 10 illustrates an exemplary packet type table 1000 which includes data identifying various kinds of link and packet types supported by a wireless communications device, such as a device employing the architecture of FIG. 9. Packet type table 1000 includes data for basic rate and medium rate Bluetooth (e.g., ptt=1) communications as shown by reference number 1002. Packet type table 1000 is further modified to include data 1004 for high rate (HR) communications (e.g., ptt=2) and UWB communications (e.g., ptt=3).

Figure 11:
FIG. 11 is an exemplary packet type table request parameters and packet type table parameters.

FIG. 11 illustrates an exemplary packet type table request (LMP_packet_type_table_req) PDU 1102. As shown in FIG. 11, this PDU may include a member address (AM_ADDR) parameter and a packet type table parameter.

Figure 12:
FIG. 12 is a diagram showing details of a packet type table parameter.

FIG. 12 is a diagram showing details of the packet type table parameter. As shown in FIG. 12, this parameter includes an indicator 1202, which specifies a column number of Table 1000 (i.e., a ptt value). As described above with reference to FIG. 10, columns 2 and 3 correspond to HR communications and UWB communications, respectively. An exemplary range of potential values for indicator 1202 is 0 through 255.

Although not shown, a packet type table response PDU (LMP_packet_type_table_res) includes information similar to the information conveyed in the LMP_packet_type_table_req PDU.

An exemplary implementation will be described with reference to this additional packet table type embodiment with reference to FIGS. 10 and 11. In this implementation, general processes in establishing a Bluetooth link may be employed. However, a master device sends a packet type table request (LMP_packet_type_table_req) to a slave device. This request includes a packet type table value (e.g., ptt=3). In response, the master device receives packet type table response (LMP_packet_type_table_res) from the slave device. This response includes a packet type table value (e.g., ptt=3).

With this exchange of PDUs, the master device verifies that the slave device is UWB capable (e.g., ptt=3) and requests UWB link establishment (e.g. ptt=3). If the slave device accepts the proposed ptt, then the slave device sends to the master device an acceptance PDU (LMP_accepted). Thereafter, a UWB link is establish between the master and slave device. For example, the device with the active member address (AM_ADDR) or logical transport address (LT_ADDR) employs link according to the parameters in the column ptt=3, such as shown in FIG. 10.

Figure 13:
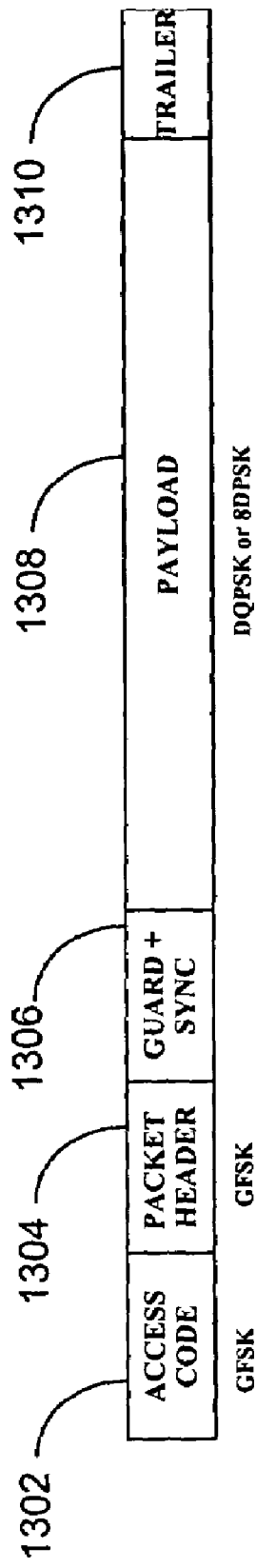
FIG. 13 is a diagram of a packet structure.

As described above, UWB/HR radio transmissions may be scheduled as Bluetooth transmissions in a time division manner that employs the timing of the Bluetooth slot structure. This may be performed by utilizing a current medium rate packet structure and transmitting higher data rate signals in the payload part of the packet. FIG. 13 is a diagram of a medium rate packet structure. This structure includes an access code 1302, a packet header 1304, a guard time and synchronization sequence 1306, a payload 1308, and a trailer 1310.

The main difference in the packet structure of FIG. 13 from the basic rate packet structure is the addition of guard time and synchronization sequence 1306 following packet header 1304. This guard time allows for settling and switching in the hardware during the transition from one modulation scheme to the other for payload 1308. With a DPSK modulated signal, the payload is followed with two trailer symbols. In every packet, access code 1302 and header 1304 is sent by basic rate Bluetooth radio. However, during payload 1308, the modulation or completely different radio is switched on. While, this radio is using Bluetooth slot timing, characteristics such as the used frequency band, modulation type, and UWB transmission are freely chosen for payload 1308.

VIII. Conclusion

While various embodiments of the present invention have been described above, it should be understood that they have been presented by way of example only, and not in limitation. For instance, although examples have been described involving Bluetooth and UWB technologies, other short-range and longer range communications technologies are within the scope of the present invention.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of establishing a wireless communications link, the method comprising:
    (a) discovering by a wireless communicating device (WCD) in an ad hoc network the existence of a remote device within a coverage area through a first short-range communications interface, the first short-range communications interface communicating through a first short-range communications link according to a first short-range communications protocol;
    (b) determining through the first short-range communications link whether the remote device is capable of supporting communications over a second short-range communications link through a second short-range communications interface, the second short-range communications interface operating according to a second short-range communications protocol;
    (c) exchanging information by the WCD with the remote device across the first communications link to establish the second short-range communications link between the WCD and the remote device if step (b) determines that the remote device is capable of supporting communications over the second short-range communications link;
    (d) activating the second short-range communications interface to establish the second short-range communications link with the remote device based on the information exchanged across the first short-range communications link, and
    (e) controlling transmissions of the first and second communication links to operate in a scheduled manner.

2. The method of claim 1, further comprising directing the remote device to start communicating with the WCD after establishment of the second short-range wireless communications link.

3. The method of claim 2, wherein the first short-range communications link is a Bluetooth link and the second short-range communications link is an ultra wideband (UWB) link, said directing step comprising:
    sending a Bluetooth link manager protocol (LMP) message to the remote device, the LMP message adapted to direct the remote device to begin accepting transmissions across the UWB link.

4. The method of claim 3, wherein the LMP message includes one or more UWB parameters.

5. The method of claim 1, further comprising communicating with the remote device by the WCD across the second short-range communications link.

6. The method of claim 1, wherein the first communications link is a Bluetooth link.

7. The method of claim 1, wherein the second communications link is an ultra wideband (UWB) link.

8. The method of claim 1, wherein the first communications link is a Bluetooth link and the second communications link is an ultra wideband (UWB) link.

9. The method of claim 8, wherein the UWB link employs a slot timing structure of the Bluetooth link.

10. The method of claim 1, further comprising establishing the first short-range communications link with the remote device.

11. The method of claim 10, wherein said first communications link is a Bluetooth link, said establishing step comprising:
    performing a Bluetooth paging process with the remote device.

12. The method of claim 1, wherein step (b) comprises:
    (1) sending a request to the remote device across the first communications link, the request inquiring whether the remote device desires to establish the second communications link; and
    (2) receiving an acknowledgement from the remote device through the first communications link, the acknowledgement indicating that the remote device desires to establish the second communications link.

13. The method of claim 12, wherein the first short-range communications link is a Bluetooth link and the second short-range communications link is an ultra wideband (UWB) link, said step (1) comprising:
    sending a Bluetooth link manager protocol (LMP) message over the first link to the remote device, the LMP message adapted to inquire whether the remote device desires to establish a second UWB link.

14. The method of claim 1, wherein the first short-range communications link is a Bluetooth link, step (b) comprising:
    sending a Bluetooth link manager protocol (LMP) message to the remote device requesting packet type table including information identifying one or more supported links and packet types.

15. The method of claim 14, wherein the second short-range communications link is an ultra wideband (UWB) link.

16. The method of claim 15, wherein the second short-range communications link is a high rate (HR) link.

17. A wireless communications device, comprising:
    a first segment adapted to exchange information with a remote device across a first short-range wireless communications link of a first type in an ad hoc network;
    a host coupled to the first segment, the host adapted to cause the first segment to exchange information with the remote device across the first communications link to set up a second short-range wireless communications link of a second type operating according to a second short-range communications protocol, in response of determining through the first short-range communications link that the remote device is capable of supporting a short-range communications link of the second type, the information including one or more parameters of the second short-range communications link;
    a second segment adapted to exchange information with the remote device across the second communications link; and
    link controllers controlling transmission of the first and second communication links to operate in a scheduled manner.

18. The wireless communications device of claim 17, wherein the first communications link is a Bluetooth link.

19. The wireless communications device of claim 17, wherein the second communications link is an ultra wideband (UWB) link.

20. The wireless communications device of claim 17, wherein the first communications link is a Bluetooth link and the second communications link is an ultra wideband (UWB) link, both links connecting the host to the remote device.

21. The wireless communications device of claim 20, wherein the UWB link employs a slot timing structure of the Bluetooth link.

22. The wireless communications device of claim 20, wherein the first segment includes a link manager adapted to exchange one or more Bluetooth link manager protocol (LMP) messages with the remote device.

23. A wireless communications device, comprising:
a first segment adapted to exchange information with a remote device across a first short-range wireless communications link of a first type;
a host coupled to the first segment, the host adapted to cause the first segment to exchange information with the remote device across the first communications link to set up a second short-range wireless communications link of a second type operating according to a second short-range communications protocol, in response of determining through the first short-range communications link that the remote device is capable of supporting a short-range communications link of the second type, the information including one or more parameters of the second short-range communications link; and
a second segment adapted to exchange information with the remote device across the second communications link;
wherein the first communications link is a Bluetooth link and the second communications link is an ultra wideband (UWB) link, both links connecting the host to the remote device;
wherein the first segment includes a link manager adapted to exchange one or more Bluetooth link manager protocol (LMP) messages with the remote device; and
wherein the one or more LMP messages includes an LMP message (LMP switch_to_UWB_link_req) adapted to direct the remote device to begin accepting transmissions across the UWB link.

24. The wireless communications device of claim 23, wherein the LMP message includes one or more UWB parameters.

25. The wireless communications device of claim 22, wherein the one or more LMP messages includes an LMP message adapted to inquire whether the remote device desires to establish the UWB link.

26. The wireless communications device of claim 22, wherein the one or more LMP messages includes an LMP message adapted to determine whether the remote device is capable of supporting the Bluetooth link and the UWB link.

27. The wireless communications device of claim 26, wherein the one or more LMP messages includes a packet type table request message.

28. A system for establishing a wireless communications link, comprising:
means for discovering by a wireless communicating device (WCD) in an ad hoc network the existence of a remote device within a coverage area through a first short-range communications interface, the first short-range communications interface communicating through a first short-range communications link according to a first short-range communications protocol;
means for determining by the wireless communicating device (WCD) through the first short-range communications link whether the remote device is capable of supporting communications over a second short-range communications link through a second short-range communications interface, the second short-range communications interface operating according to a second short-range communications protocol;
means for exchanging information by the WCD with the remote device across the first communications link to establish the second short-range communications link if said determining means determines that the remote device is capable of supporting communications over the second short-range communications link;
means for activating the second short-range communications interface to establish the second short-range communications link with the remote device based on the information exchanged across the first short-range communications link, and
means for controlling transmissions of the first and second communication links to operate in a scheduled manner.

29. A computer program product, comprising:
a computer useable medium having computer program logic recorded thereon for enabling a processor in an ad hoc network to establish a wireless communications link, the computer program logic comprising:
program code for enabling the processor to discover the existence of a remote device within a coverage area through a first short-range communications interface, the first short-range communications interface communicating through a first short-range communications link according to a first short-range communications protocol;
program code for enabling the processor to determine through the first short-range communications link whether the remote device is capable of supporting communications over a second short-range communications link through a second short-range communications interface, the second short-range communications interface operating according to a second short-range communications protocol;
program code for enabling the processor to exchange information with the remote device across the first communications link to initiate the second short-range communications link if the program code for enabling the processor to determine determines that the remote device is capable of supporting communications over the second short-range communications link;
program code for enabling the processor to activate the second short-range communications interface to establish the second short-range communications link with the remote device based on the information exchanged across the first short-range communications link, and
program code for enabling transmission of the first and second communication links to operate in a scheduled manner.

* * * * *